United States Patent [19]

Tidemann, Jr. et al.

[11] Patent Number: 6,108,372
[45] Date of Patent: Aug. 22, 2000

[54] METHOD AND APPARATUS FOR DECODING VARIABLE RATE DATA USING HYPOTHESIS TESTING TO DETERMINE DATA RATE

[75] Inventors: Edward G. Tidemann, Jr., San Diego, Calif.; Yu-Chuan Lin, Vancouver, Canada

[73] Assignee: Qualcomm Inc., San Diego, Calif.

[21] Appl. No.: 08/741,273

[22] Filed: Oct. 30, 1996

[51] Int. Cl.$^7$ .............................. H04B 3/46; H04B 17/00
[52] U.S. Cl. .......................... 375/225; 375/341; 714/704; 714/795
[58] Field of Search ..................... 375/200, 206, 375/224, 225, 262, 265, 240, 340, 341; 370/203, 208, 209, 320, 335, 342, 441, 447, 479; 455/67.1; 371/5.1, 43.6, 43.7; 704/201, 229, 500; 364/400.01, 550

[56] References Cited

U.S. PATENT DOCUMENTS

| | | | |
|---|---|---|---|
| 4,748,626 | 5/1988 | Wong | 371/30 |
| 4,845,714 | 7/1989 | Zook | 371/50 |
| 5,023,889 | 6/1991 | Divsalar et al. | 375/27 |
| 5,056,117 | 10/1991 | Gitlin et al. | 375/102 |
| 5,208,816 | 5/1993 | Seshardsi et al. | 371/43 |
| 5,416,787 | 5/1995 | Kodama et al. | 371/43 |
| 5,509,020 | 4/1996 | Iwakiri et al. | 371/5.1 |
| 5,566,206 | 10/1996 | Butler et al. | 375/225 |
| 5,671,255 | 9/1997 | Wang et al. | 375/341 |
| 5,710,784 | 1/1998 | Kindred et al. | 375/262 |
| 5,751,725 | 5/1998 | Chen | 371/5.5 |
| 5,796,757 | 8/1998 | Czaja | 371/46 |

FOREIGN PATENT DOCUMENTS

| | | | |
|---|---|---|---|
| 0413505 | 8/1990 | European Pat. Off. | H03M 13/12 |
| 0544315 | 11/1992 | European Pat. Off. | H03M 13/00 |
| 0711056 | 5/1996 | European Pat. Off. | H04L 23/02 |
| 0713305 | 5/1996 | European Pat. Off. | H04L 25/02 |

OTHER PUBLICATIONS

"Viterbi Decoding Algorithm for Convolutional Codes with Repeat Request" by Hirosuke Yamamoto et al.; *IEEE Transactions on Information Theory*, vol. IT–26 No. 26. pp540–547.

"Generalized Viterbi Algorithms for Error Detection with Convolutional Codes" by N. Seshadri et al.; *AT&TBell Laboratories*, 1989, IEEE pp. 1534–1538.

"Combined Source and Channel Coding of Subband Coded Speech with Post–enhancement" by W.C. Wong et al.; *Communications System;Toward Global Integration*, Nov. 1990, vol. 2. 886–890.

*Primary Examiner*—Temesghen Ghebretinsae
*Attorney, Agent, or Firm*—Philip Wadsworth; Thomas R. Rouse

[57] ABSTRACT

A system and method for determining the data rate of a frame of data at a receiver of a variable rate communications system. A vocoder at a transmitter encodes a frame of data at one of the rates of a predetermined set of rates. The data rate is dependent on the speech activity during the time frame of the data. The data frame is also formatted with overhead bits, including bits for error detection and detection. At the receiver, the data rate for the frame is determined based on hypothesis testing. Because the data rate is based on speech activity, a hypothesis test may be designed based on the statistics of speech activity. The received data frame is first decoded into information bits at the most probable rate as provided by the hypothesis test. Error metrics are generated for the decoded information bits. If the error metrics indicate that the information bits are of good quality, then the information bits are presented to a vocoder at the receiver to be processed for interface with the user. If the error metrics indicate that the information bits have not been properly decoded, then the received data frame is decoded at the other rates of the set of rates until the actual data rate is determined.

23 Claims, 8 Drawing Sheets

METHOD AND APPARATUS FOR DECODING VARIABLE RATE DATA USING HYPOTHESIS TESTING TO DETERMINE DATA RATE

BACKGROUND OF THE INVENTION

I. Field of the Invention

The present invention relates to digital communications. More particularly, the present invention relates to a novel and improved system and method for determining, at a receiver of a variable rate communication system, the rate at which data has been encoded for transmission.

II. Description of the Related Art

The use of code division multiple access (CDMA) modulation techniques is one of several techniques for facilitating communications in which a large number of system users are present. Although other techniques such as time division multiple access (TDMA), frequency division multiple access (FDMA), and AM modulation schemes such as amplitude companded single sideband (ACSSB) are known, CDMA has significant advantages over these other techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention and incorporated by reference herein.

CDMA systems often employ a variable rate vocoder to encode data so that the data rate can be varied from one data frame to another. An exemplary embodiment of a variable rate vocoder is described in U.S. Pat. No. 5,414,796, entitled "VARIABLE RATE VOCODER," assigned to the assignee of the present invention and incorporated by reference herein. The use of a variable rate communications channel reduces mutual interference by eliminating unnecessary transmissions when there is no useful speech to be transmitted. Algorithms are utilized within the vocoder for generating a varying number of information bits in each frame in accordance with variations in speech activity. For example, a vocoder with a set of four rates may produce 20 millisecond data frames containing 16, 40, 80, or 171 information bits, depending on the activity of the speaker. It is desired to transmit each data frame in a fixed amount of time by varying the transmission rate of communications.

Additional details on the formatting of the vocoder data into data frames are described in U.S. Pat. No. 5,511,073, entitled "METHOD AND APPARATUS FOR THE FORMATTING OF DATA FOR TRANSMISSION," assigned to the assignee of the present invention and herein incorporated by reference. The data frames may be further processed, spread spectrum modulated, and transmitted as described in U.S. Pat. No. 5,103,459, entitled "SYSTEM AND METHOD FOR GENERATING WAVEFORMS IN A CDMA CELLULAR TELEPHONE SYSTEM," assigned to the assignee of the present invention and incorporated by reference herein.

Variable rate systems can be developed which include explicit rate information. If the rate is included as part of a variable rate frame, then the rate is not recoverable until after the frame has already been properly decoded, at which point the rate has already been determined. Rather than including the rate in a variable rate frame, the rate could instead be sent in a non-variable rate portion of the frame. However, only a few bits are typically needed to represent the rate, and these bits cannot be efficiently encoded and interleaved in order to provide error protection for fading communications channels. Furthermore, the rate information is only available after some decoding delay and are subject to error.

Alternatively, variable rate systems can be developed which do not include explicit rate information. One technique for the receiver to determine the rate of a received data frame where the rate information is not explicitly included in the frame is described in copending U.S. patent application Ser. No. 08/233,570, U.S. Pat. No. 5,586,206 entitled "METHOD AND APPARATUS FOR DETERMINING DATA RATE OF TRANSMITTED VARIABLE RATE DATA IN A COMMUNICATIONS RECEIVER," filed Apr. 26, 1994, assigned to the assignee of the present invention, and incorporated by reference. Another technique is described in copending U.S. patent application Ser. No. 08/126,477, entitled "MULTIRATE SERIAL VITERBI DECODER FOR CODE DIVISION MULTIPLE ACCESS SYSTEM APPLICATIONS," filed Sep. 24, 1993, assigned to the assignee of the present invention, and incorporated by reference. According to these techniques, each received data frame is decoded at each of the possible rates. Error metrics, describing the quality of the decoded symbols for each frame decoded at each rate, are provided to a processor. The error metrics may include Cyclic Redundancy Check (CRC) results, Yamamoto Quality Metrics, and Symbol Error Rates. These error metrics are well-known in communications systems. The processor analyzes the error metrics and determines the most probable rate at which the incoming symbols were transmitted.

Decoding each received data frame at each possible data rate will eventually generate the desired decoded data. However, the search through all possible rates is not the most efficient use of processing resources in a receiver. Also, as higher transmission rates are used, power consumption for determining the transmission rate also increases. This is because there are more bits per frame to be processed. Furthermore, as technology evolves, variable rate systems may utilize larger sets of data rates for communicating information. The use of larger sets of rates will make the exhaustive decoding at all possible rates infeasible. In addition, the decoding delay will not be tolerable for some system applications. Consequently, a more efficient rate determination system is needed in a variable rate communications environment. These problems and deficiencies are clearly felt in the art and are solved by the present invention in the manner described below.

SUMMARY OF THE INVENTION

The present invention is a novel and improved system and method for determining the transmission rate of communications in a variable rate communications system. In a variable rate system, the data rate at which a data frame is encoded may be based on the speech activity during the time frame. Because the characteristics of speech are known, probability functions may be defined for the data rates which are dependent on the characteristics of speech. The probability functions may in addition be dependent on the measured statistics of the received data frames. Furthermore, hypothesis tests can be designed based on the probability functions to determine the most likely data rate of a received frame of data. These probability functions may be dependent on the selected service option. For example, the probability functions for data services will be different than for voice services.

At the receiver of the present invention, a processor causes a decoder to decode the received frame of data into information bits at the most probable rate as determined by the hypothesis test. The most probable rate may, for example, be the rate of the previous frame of data. The decoder also generates error metrics for the decoded information bits. The decoded bits and the error metrics are provided to a data check element which checks the decoded bits for correctness. If the error metrics indicate that the decoded information bits are of good quality, then the information bits are provided to a vocoder which further processes the data and provides speech to the user. Otherwise, a failure signal is presented to the processor. The processor then causes the decoder to decode the received frame of data at other data rates until the correct data rate is found.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
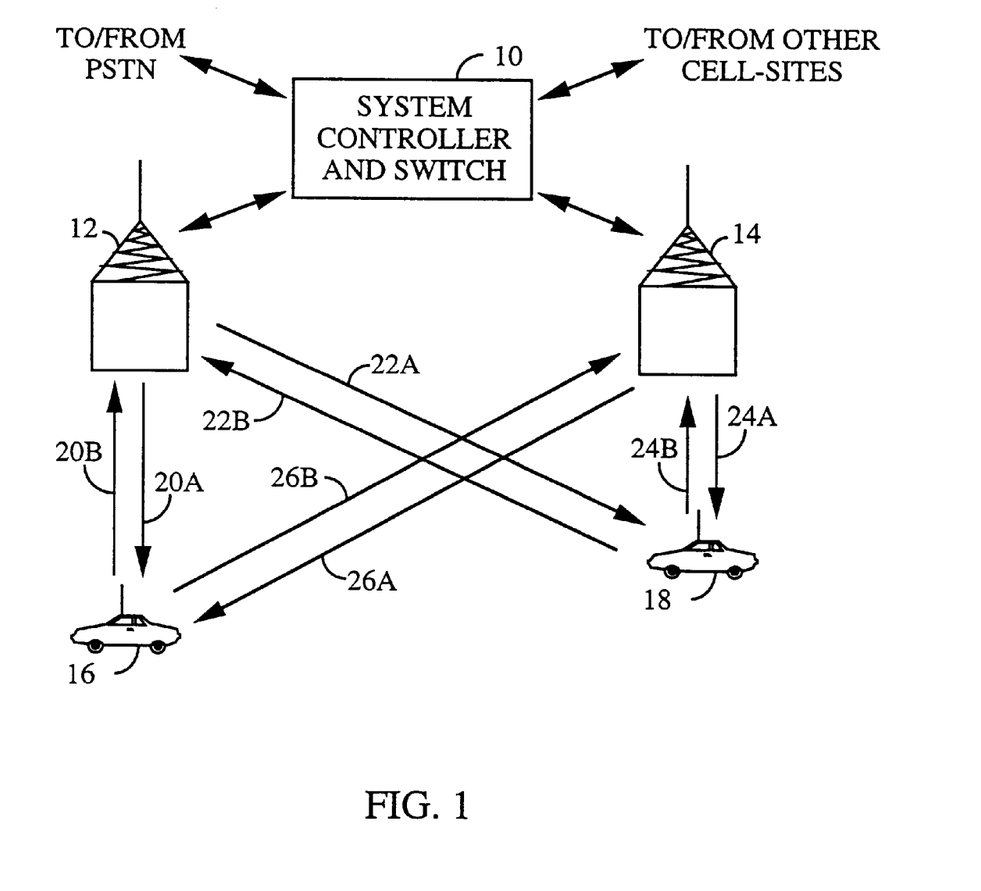
FIG. 1 is a schematic overview of an exemplary CDMA cellular telephone system.

An exemplary cellular mobile telephone system in which the present invention is embodied is illustrated in FIG. 1. For purposes of example this system is described herein within the context of a CDMA cellular communications system. However, it should be understood that the invention is applicable to other types of communication systems such as personal communication systems (PCS), wireless local loop, private branch exchange (PBX) or other known systems. Furthermore systems utilizing other well known transmission modulation schemes such as TDMA and FDMA as well as other spread spectrum systems may employ the present invention.

An exemplary cellular system in which the rate determination system of the present invention may be implemented is illustrated in FIG. 1. In FIG. 1, system controller and switch 10 typically include appropriate interface and processing hardware for providing system control information to the cell-sites. Controller 10 controls the routing of telephone calls from the public switched telephone network (PSTN) to the appropriate cell-site for transmission to the appropriate mobile unit. Controller 10 also controls the routing of calls from the mobile units via at least one cell-site to the PSTN.

Controller 10 may direct calls between mobile users via the appropriate cell-site stations since such mobile units do not typically communicate directly with one another.

Controller 10 may be coupled to the cell-sites by various means such as dedicated telephone lines, optical fiber links or by radio frequency communications. In FIG. 1, two exemplary cell-sites, 12 and 14, along with two exemplary mobile units, 16 and 18, which include cellular telephones, are illustrated. Arrows 20a–20b and 22a–22b respectively define the possible communication links between cell-site 12 and mobile units 16 and 18. Similarly, arrows 24a–24b and arrows 26a–26b respectively define the possible communication links between cell-site 14 and mobile units 18 and 16.

The cellular system illustrated in FIG. 1 may employ a variable rate data channel for communications between cell-sites 12, 14 and mobile units 16, 18. By example, a vocoder (not shown) may encode sampled voice information into symbols at four different rates according to the IS-95-A standard. The IS-95-A Mobile Station-Base Station Compatibility Standard for Dual Mode Wideband Spread Spectrum Cellular System has been provided by the telecommunications industry association (TIA) for CDMA communications. According to IS-95-A, speech is encoded at approximately 8,550 bits per second (bps), 4,000 bps, 2,000 bps, and 800 bps based on voice activity during a 20 millisecond (ms) frame of data. Each frame of vocoder data is then formatted with overhead bits as 9,600 bps, 4,800 bps, 2,400 bps, and 1,200 bps data frames for transmission. The 9,600 bps frame is referred to as a full rate frame; the 4,800 bps data frame is referred to as a half rate frame; a 2,400 bps data frame is referred to as a quarter rate frame; and a 1,200 bps data frame is referred to as an eighth rate frame. Although this example describes a set of four data rates of the IS-95-A standard, it should be recognized that the present invention is equally applicable in systems utilizing different transmission rates and/or a different number of variable rates.

By encoding each frame of data based on speech activity, data compression is achievable without impacting the quality of the reconstructed speech. Since speech inherently contains periods of silence, i.e. pauses, the amount of data used to represent these periods can be reduced. Variable rate vocoding most effectively exploits this fact by reducing the data rate for these periods of silence. In a system with a set of four rates as described above, periods of active speech will generally be encoded at full rate, while periods of silence will generally be encoded at eighth rate. Most frames (about 80–90%) are encoded at full or eighth rate. Transitions between active speech and periods of silence will typically be encoded at half or quarter rate. An exemplary encoding technique which compresses data based on speech activity is described in U.S. Pat. No. 5,511,073 mentioned above.

The data frames are also formatted with overhead bits, which generally will include additional bits for error correction and detection, such as Cyclic Redundancy Check (CRC) bits. The CRC bits can be used by the decoder to determine whether or not a frame of data has been received correctly. CRC codes are produced by dividing the data block by a predetermined binary polynomial as is described in detail in IS-95-A.

In a preferred embodiment, each frame of symbol data is interleaved by an interleaver, preferably on a bit level basis, to increase time diversity for purposes of error detection. The formatted data frames undergo further processing, which include modulation, frequency upconversion to the radio frequency (RF) and amplification of the signals of data frames, before transmission.

When signals of the variable rate data frames are received by a receiver, the receiver must determine the rate of transmission in order to properly decode the signals. However, the rate of the received frame is not known by the mobile station a priori. Therefore, some other method of ascertaining the rate is necessary.

The present invention accomplishes rate determination through the use of hypothesis testing. Hypothesis tests are designed based on the probability distribution of the data rates of the frames of speech. Although the data rate of each received frame is not known a priori, the probability of receiving a frame at a given rate can be determined. As mentioned above, a variable rate vocoder encodes each frame of speech at one of a set of redetermined rates based on the speech activity during the time frame. Since the characteristics of speech activity can be modeled, probabilistic functions of the data rates which depend on speech activity can be derived from the model. Hypothesis tests can then be designed based on the probabilistic functions of data rates to determine the most likely data rate for each received frame of data.

Figure 2:
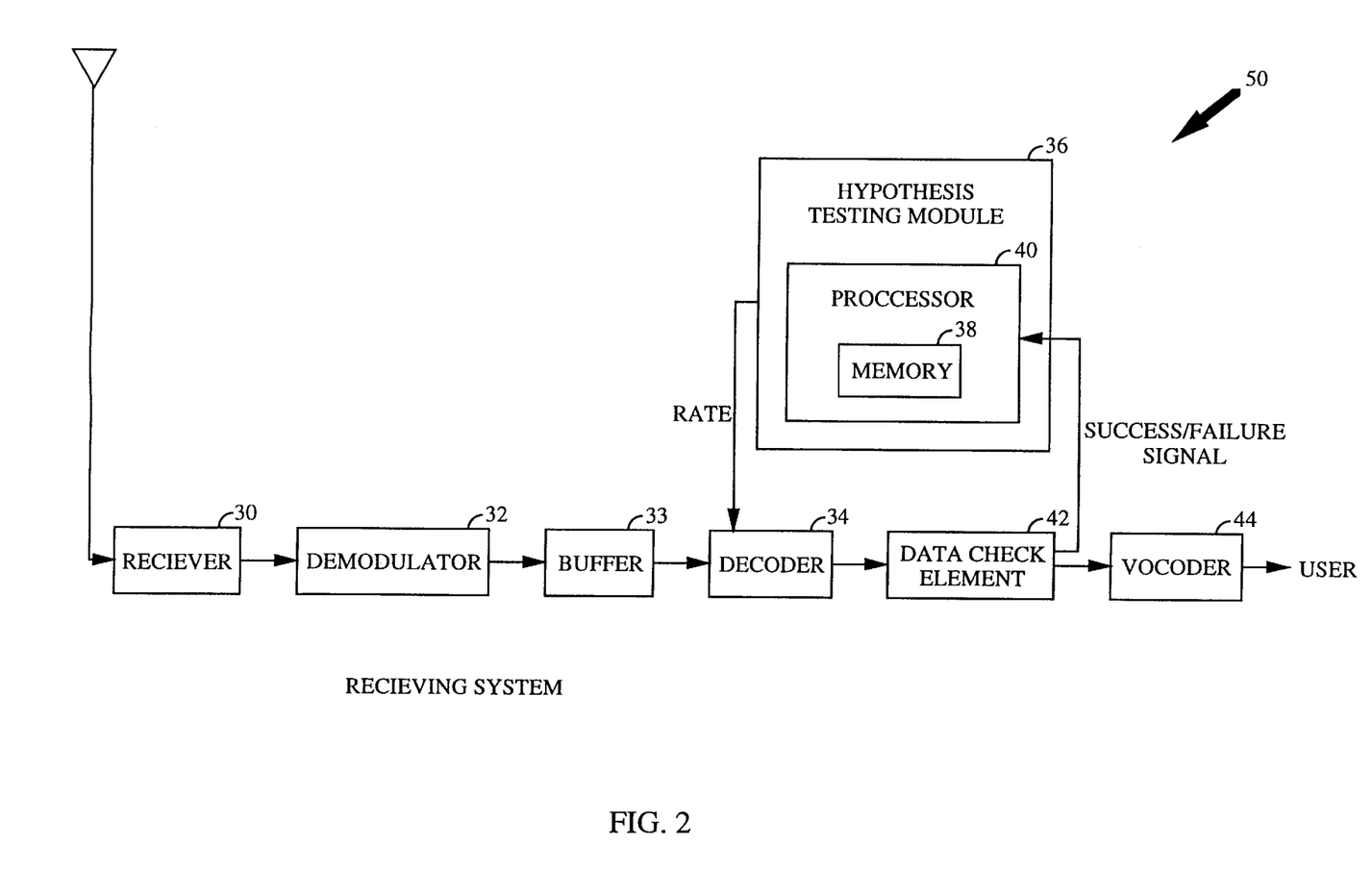
FIG. 2 is a block diagram of a variable rate receiving system with particular reference to the rate determination features of the present invention.

The use of hypothesis testing for rate determination in a variable rate receiving system may be better appreciated by referring to FIG. 2. In a CDMA environment, for example, the receiving system 50 of FIG. 2 may be implemented in either a mobile unit or a cell site in order to determine the data rate of received signals. The present invention offers particular advantages because it avoids the exhaustive decoding at all rates. By choosing a hypothesis and checking the hypothesis for correctness, the average amount of processing for each received frame is reduced. This is especially important in the mobile unit because reduced processing, and thereby power consumption, in the decoding process can extend battery life in the receiver.

The variable rate receiving system 50 illustrated in FIG. 2 includes receiver 30 for collecting transmitted signals, including the data signal of interest. Receiver 30 amplifies and frequency downconverts the received signals from the RF frequency band to the intermediate frequency (IF) band.

The IF signals are presented to demodulator 32. The design and implementation of demodulator 32 are described in detail in U.S. Pat. No. 5,490,165, entitled "DEMODULATION ELEMENT ASSIGNMENT IN A SYSTEM CAPABLE OF RECEIVING MULTIPLE SIGNALS," issued Feb. 6, 1996, and assigned to the assignee of the present invention, the disclosure of which is incorporated by reference herein. Demodulator 32 demodulates the IF signal to produce a data signal consisting of the symbols of one frame of data. Demodulator 32 generates the data signal by despreading and correlating the IF signal addressed to the receiver. The demodulated data signal is then fed to buffer 33. Buffer 33 stores the demodulated data signal, or the received symbols, until it is properly decoded. Buffer 33 may also be the deinterleaver if the data frame had been interleaved for transmission. Buffer 33 provides the demodulated symbol data to decoder 34.

Hypothesis testing module 36 implements the hypothesis test for determining the data rate of a received frame of data. Hypothesis testing module 36 comprises processor 40, which includes memory 38. The information needed in hypothesis testing such as the decoded rates from the previous frames and the probabilities are stored in memory 38. For each data frame received, processor 40 determines the most probable rate based on the information stored in memory 38. Processor 40 then presents the most probable data rate to decoder 34 which decodes the data signal at this most probable rate to produce decoded bits.

In the exemplary embodiment, decoder 34 is a trellis decoder capable of decoding data of varying rates, such as a Viterbi decoder. The design and implementation of a multirate Viterbi decoder which exhaustively decodes a received signal at all rates of a set of rates is described in the aforementioned U.S. patent application Ser. Nos. 08/233,570 U.S. Pat. No. 5,586,206 and Ser. No. 08/126,477. It will be understood by one skilled in the art that the multirate Viterbi decoder may be modified to decode at a selected rate. This may be accomplished by having the Viterbi decoder receive a rate indicator input, in response to which the decoder decodes the data signal according to the rate indicator. Thus, the modified Viterbi decoder may decode a received data frame based on a rate indicator supplied by processor 40 of hypothesis testing module 36.

Decoder 34 generates information data bits and error metrics characterizing the information bits. The error metrics include the previously described CRC bits, which were added into the data frames as overhead bits. Decoder 34 may also generate other error metrics, such as the Yamamoto Quality Metric and the Symbol Error Rate (SER). The Yamamoto metric is determined by comparing the differences in the metrics of remerging paths in each step of the Viterbi decoding with a threshold and labeling a path as unreliable if the metric difference is less than a quality threshold. If the final path selected by the Viterbi decoder has been labeled as unreliable at any step, the decoder output is labeled as unreliable. Otherwise, it is labeled as reliable. The Symbol Error Rate is determined by taking the decoded bits, re-encoding these bits to provided re-encoded symbols, and comparing these re-encoded symbols against the received symbols which are stored in buffer 33. The SER is a measure of the mismatching between the re-encoded symbols and the received symbols. The decoded information bits and the error metrics are provided to data check element 42, which determines if the information bits have been correctly decoded.

In a preferred embodiment, data check element 42 first checks the CRC bits. If the CRC check fails, then data check element 42 provides a signal indicative of the failure to processor 40. If the CRC check passes, then data check element 42 determines if the re-encoded SER is below a certain threshold. If the SER is above the threshold, then a signal indicative of failure is provided to processor 40. Otherwise, the data rate provided by hypothesis testing module 36 is determined to be correct, and a success signal is provided to processor 40, whereupon no further decoding is performed on the data frame. The properly decoded data signal is presented to variable rate vocoder 44.

When processor 40 receives a failure signal indicating that data symbols have not been properly decoded into information bits, processor 40 will determine at least one other data rate from the set of data rates at which to decode the data symbols. Processor 40 provides the rate information to decoder 34, which decodes the data symbols at the rate provided. For each data rate at which the data signal is decoded, data check element 42 will determine the quality of the decoded information bits. Upon determination by data check element 42 that the correct data rate has been found, a signal of decoded information bits is provided to variable rate vocoder 44. Vocoder 44 will then process the information bits for interface with the user.

Hypothesis testing module 36 may implement any of a number of hypothesis tests for determining the data rate of a received frame of data.

For example the hypothesis test may be based on known statistics of speech activity. It is known that for a set of four rates using 20 ms frames, a full rate frame will usually be followed by another full rate frame, while an eighth-rate frame will usually be followed by another eighth rate frame. Further, it is also known that most frames will either be full or eighth rate rather than half or quarter rate, because the periods of speech and silence do not occur in 20 ms bursts. Based on these characteristics, the hypothesis test may designate the rate of the previous frame of data as the most probable rate for the currently received frame of data.

Figure 3:
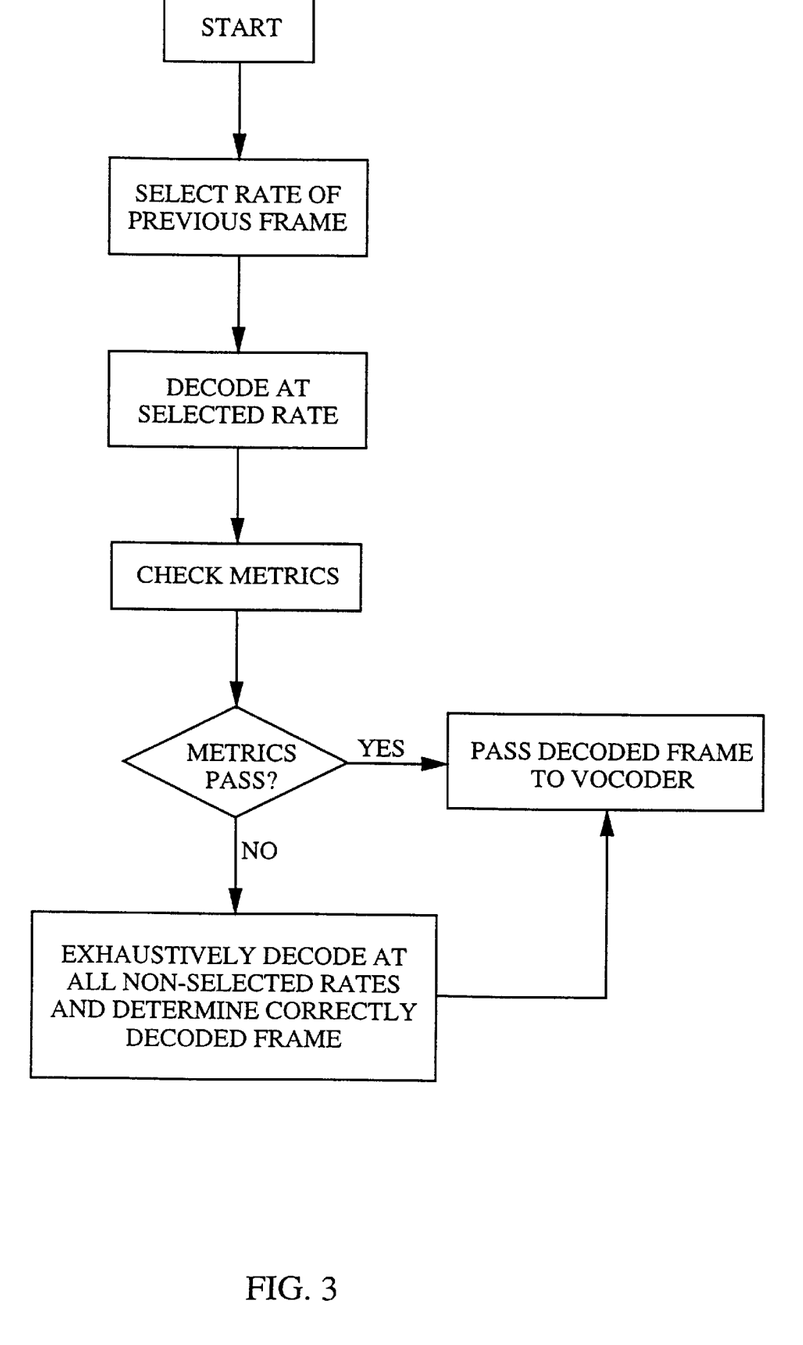
FIGS. 3 and 4 are flow charts illustrating two embodiments of the processing steps involved in rate determination wherein the hypothesis test designates the rate of the previous frame of data as the most probable rate for the current frame of data.

In an exemplary implementation, the rate of the previous frame of data is stored in memory 38 of hypothesis testing module 36. When a data frame is received, processor 40 of hypothesis testing module 36 obtains the rate of the previous frame from memory 38 and presents it to decoder 34. Decoder 34 decodes the received data frame at the rate of the previous frame to produce information bits. Decoder 34 also generates error metrics which are then presented to data check element 42 along with the information bits. If data check element 42 determines from the error metrics that the decoded bits are of good quality, then the information bits are presented to vocoder 44. Otherwise, a failure indication is sent from data check element 42 to processor 40. Processor 40 may then have decoder 34 exhaustively decode the data frame at all other rates before determining the data rate. A flow chart illustrating some of the steps involved in rate determination as described in the embodiment above is shown in FIG. 3.

Figure 4:
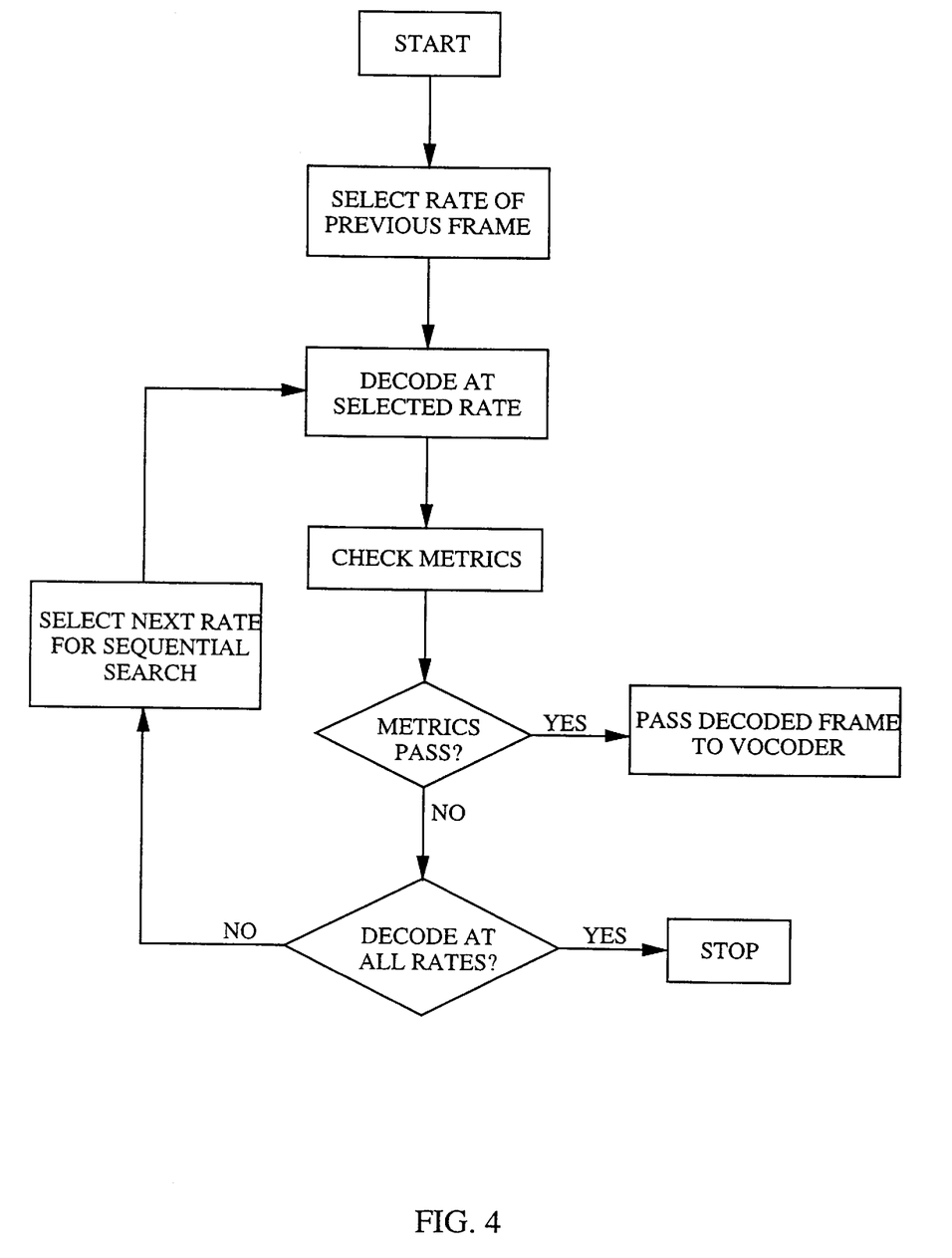

Alternatively, processor 40 may have decoder 34 sequentially decode the data frame according to a ranking from the next most likely rate to the least likely rate. The ranking may be determined in a number of ways, such as according to the probability distributions described below. For each decoding, error metrics are generated by decoder 34 and checked by data check element 42 for correctness. When correctly decoded, the decoded frame is passed on to vocoder 44. A flow chart illustrating some of the processing steps of this embodiment is shown in FIG. 4.

Figure 5:
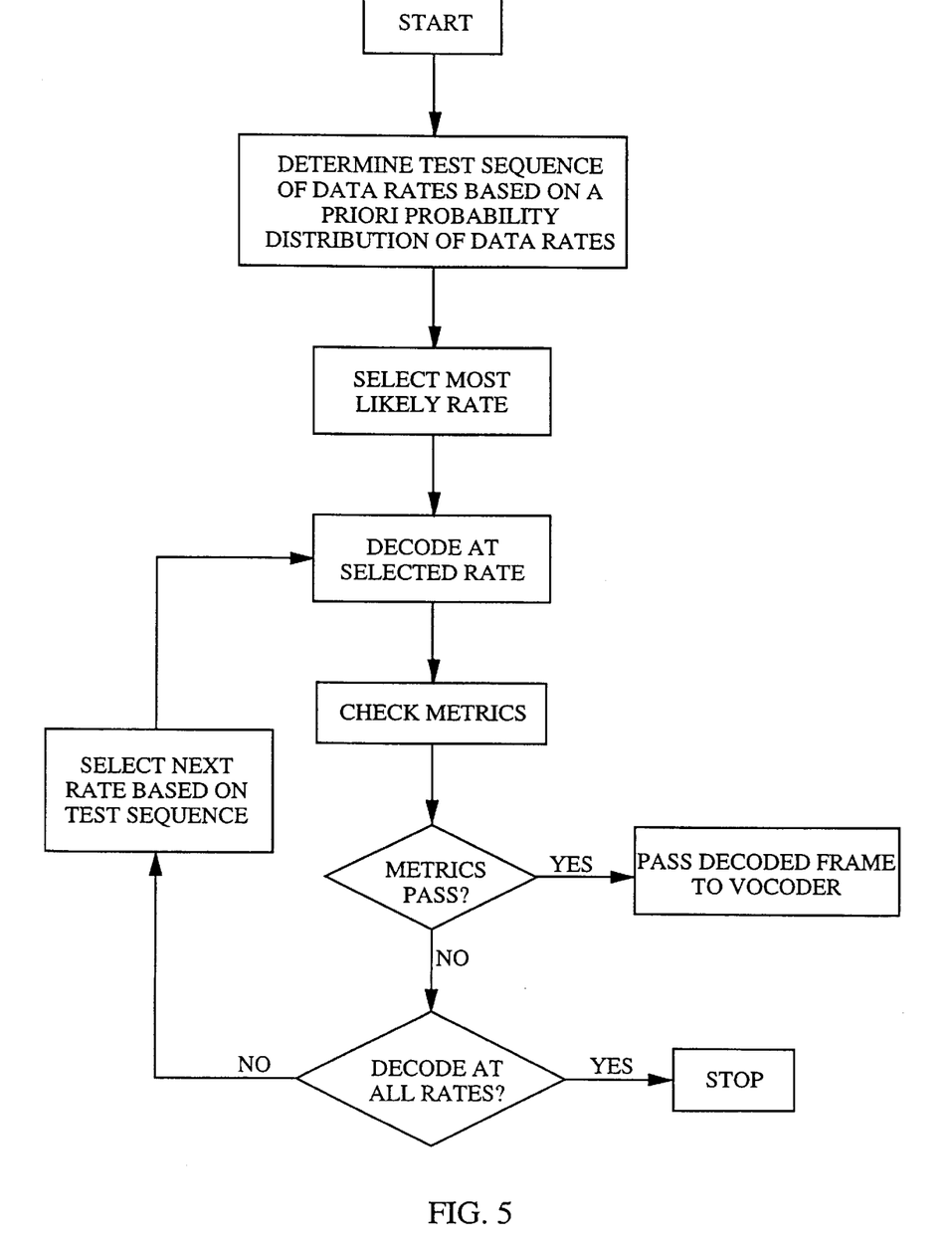
FIGS. 5 and 6 are flow charts illustrating two embodiments of the processing steps involved in rate determination wherein the hypothesis test is based on the a priori probability distribution of the data rates.
Figure 6:
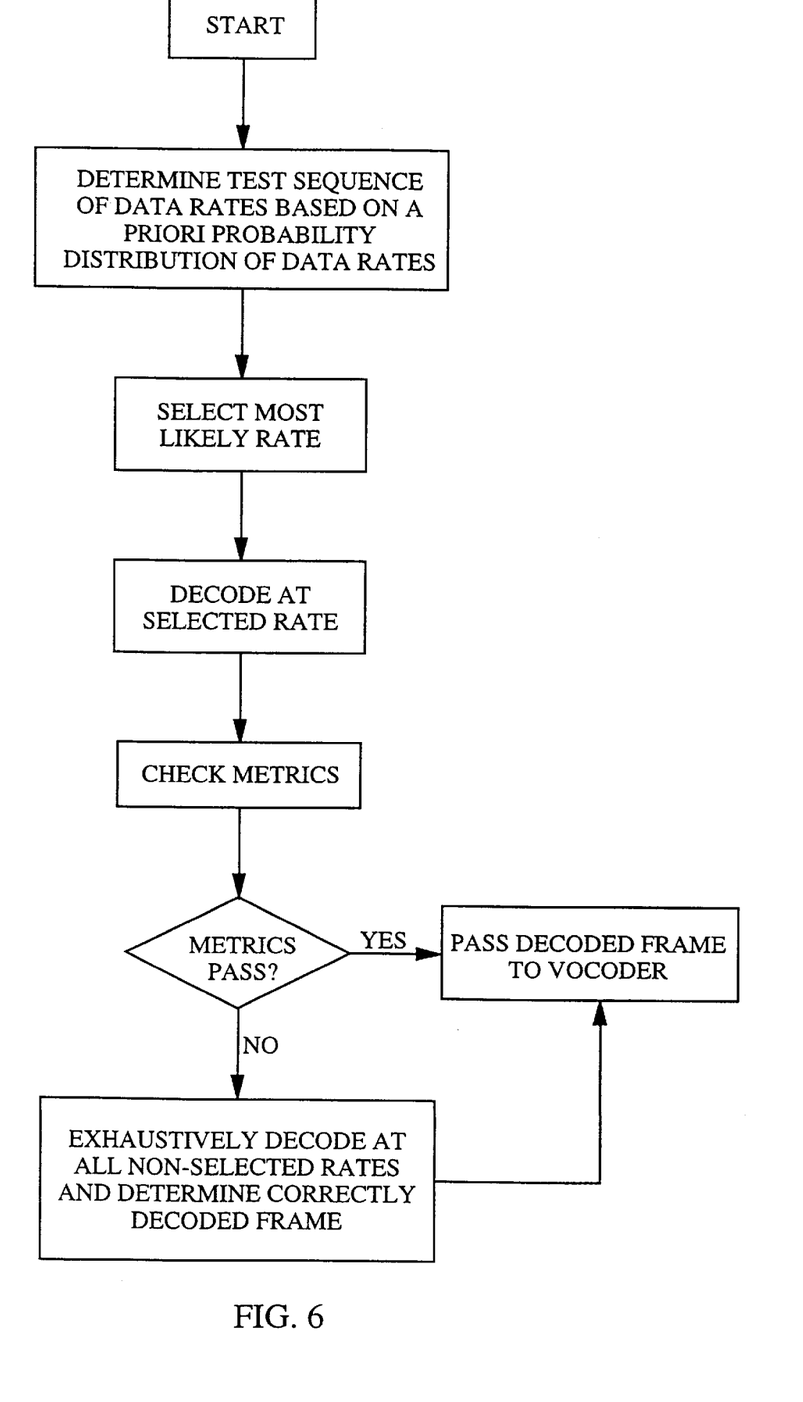

Another implementation of hypothesis testing module 36 is based upon the a priori probability distribution of data rates. For a set of four rates, the a priori probability distribution (P) of the data rates may be defined as:

$$P = \text{Prob}\{R_t\}, \quad (3)$$

where $R_t$ refers to the full, half, quarter, or eighth rate at time t. The likelihood of receiving a frame at each of the different data rates of a set of rates are maintained in memory 38 of processor 40. Generally, the probability distribution of the data rates are determined based on the theoretical statistics or the empirical statistics of speech activity. The likelihood of receiving a frame at the different rates are then permanently stored in memory 38 for determining the rate of every received frame of data. In a more sophisticated embodiment, the likelihood of the rates stored in memory 38 may be updated based on the actual statistics of the received frames of data. For each new frame of data received, processor 40 obtains the most probable rate from memory 38 and presents the most probable rate to decoder 34. Decoder 34 decodes the data signal at this most probable data rate and presents the decoded data to data check element 42. Error metrics, including the CRC, are also generated by decoder 34 and presented to data check element 42. Other error metrics may also be generated for checking by data check element 42. If the error metrics indicate that the decoded bits are of good quality, then the information bits are presented to vocoder 44. Otherwise, a failure indication is sent from data check element 42 to processor 40. Then, processor 40 obtains the second most likely data rate from memory 38 and presents it to decoder 34, and the process of decoding and error checking is continued until the correct data rate is found. A flow chart of the processing steps of this embodiment is illustrated in FIG. 5. Alternatively, upon receipt of a failure signal by processor 40, processor 40 may cause decoder 34 to exhaustively decode the data frame at each of the other data rates of the set of rates, and error metrics are checked for each decoding in order to determine the actual rate of transmission. A flow chart of the processing steps of this embodiment is illustrated in FIG. 6.

Instead of designing the hypothesis test based on the simple probability distribution of the data rates, conditional probabilities may be used to improve on the accuracy of the rate determination. For example, the probability of receiving a data frame at a given rate may be defined to be conditioned on the actual rates of the previous frames of data. Conditional probabilities based on the previous rates work well because transition characteristics of the data signals are well known. For example, if the rate two frames ago was eighth rate and the rate for the previous frame was half rate, then the most likely rate for the current frame is full rate, because the transition to half rate indicates the onset of active speech. Conversely, if the rate two frames ago was full rate and the rate for the previous frame was quarter rate, then the most likely rate for the present frame might be eighth rate, because the rate transition indicates the onset of silence.

The probability distribution of the data rates conditioned on the rates of the previous n frames of data may be defined as:

$$P = \text{Prob}\{R_t | R_{t-1}, R_{t-2}, \ldots, R_{t-n}\} \quad (4)$$

where $R_t$ again refers to the rate at time t, and $R_{t-1}, R_{t-2}, \ldots, R_{t-n}$ refers to rate(s) of the previous n frame(s) of data, for n>1. The likelihood of receiving a frame at each of the different data rates of a set of rates conditioned on the previous n actual rates are stored in memory 38 of processor 40. In addition, the actual data rates of the previous n frames of data are maintained by processor 40, and may be stored in memory 38 as the rates are determined.

Figure 7:
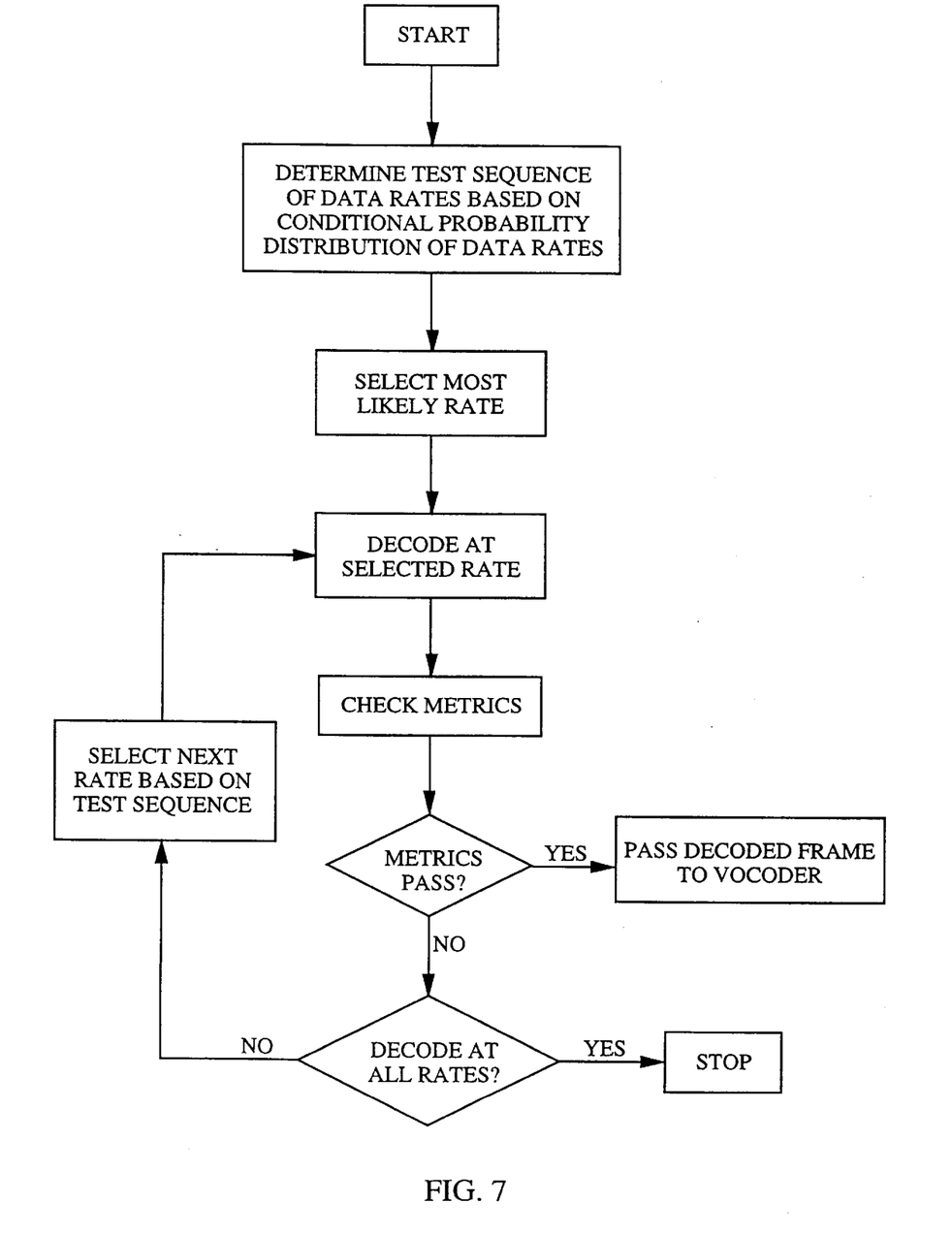
FIGS. 7 and 8 are flow charts illustrating two embodiments of the processing steps involved in rate determination wherein the hypothesis test is based on the conditional probability distribution of the data rates.

For each received frame of data, processor 40 will determine the most probable data rate conditioned on the previous n actual data rates and present it to decoder 34. Decoder 34 will decode the frame at this most probable data rate and present the decoded bits to data check element 42. In addition, error metrics are generated by decoder 34 and presented to data check element 42. If the error metrics indicate that the decoded bits are of good quality, then the information bits are presented to vocoder 44. Also, processor 40 is informed of the rate decision so that it can maintain the history of chosen rates. That is, processor 40 is supplied $R_t$ so that it can be used in determining Prob$\{R_t | R_{t-1}, R_{t-2}, \ldots, R_{t-n}\}$ for the next frame. If error metrics indicate an unsuccessful decoding, then a failure indication signal is sent from data check element 42 to processor 40, and processor 40 determines the second most probable data rate conditioned on the previous n actual data rates to decode the data frame. As in the simple probabilities case, the process of decoding and error checking is continued until the correct data rate is found. Some of the processing steps of this embodiment are illustrated in a flow chart in FIG. 7. Also as in the simple probabilities case, after a failed decoding at the most likely rate, decoder 34 may exhaustively decode the data frame at all of the other data rates and have error metrics checked for all decoding in order to determine the data rate.

Figure 8:
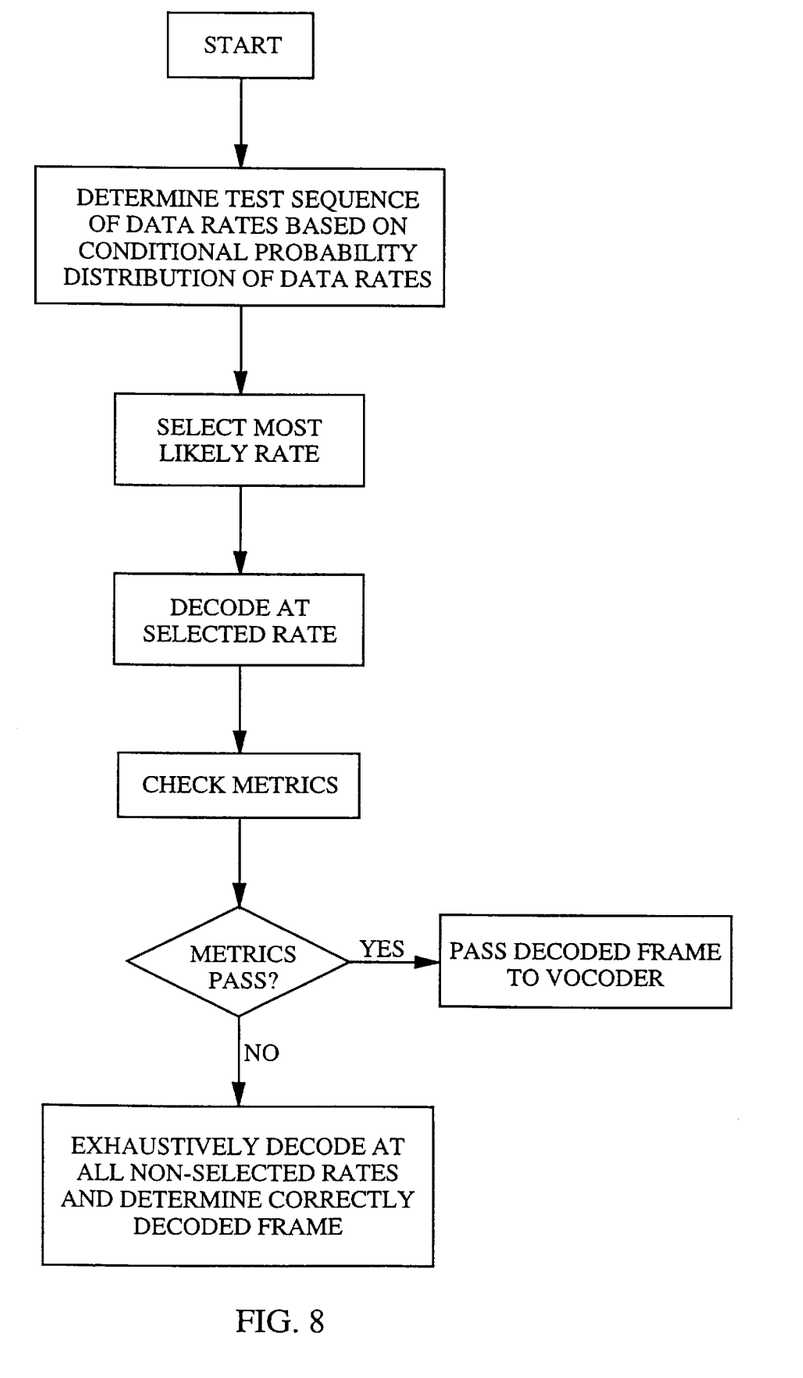

Some of the processing steps of this embodiment are illustrated in a flow chart in FIG. 8.

It should be understood that the conditional probability distribution of the data rates may depend on statistics other than the actual rates of the previous frames of data. For example, the probability distribution may be conditioned on one or more frame quality measurements. The probability distribution is then defined to be:

$$P = \text{Prob}\{R_t | X_1, X_2, \ldots, X_k\}, \quad (5)$$

where $R_t$ is the rate at time t, and $X_1, X_2, \ldots X_k$ are one or more frame quality measurements. The k frame quality measurements may be measurements performed on the current frame of data, or measurements performed on previous frame(s) of data, or a combination of both. An example of a frame quality measurement is the SER error metric mentioned above. Thus, the probability of receiving a frame at a given rate is conditioned on the SER obtained from the previous decoding if a previous decoding had been performed.

The conditional probability distribution may also depend on a combination of the actual rates of the previous frames of data and the frame quality measurements. In this case, the probability distribution of the data rates is defined as:

$$Pt = \text{Prob}\{R_t | R_{t-1}, R_{t-2}, \ldots, R_{t-n}, X_1, X_2, \ldots, X_k\}, \quad (6)$$

where $R_t$ is the rate at time t, $R_{t-1}, R_{t-2}, \ldots, R_{t-n}$ are the rates of the previous frames of data and $X_1, X_2, \ldots, X_k$ are the frame quality measurements.

In the cases where the probability distribution is based on frame quality measurements, the frame quality measurements should be maintained in processor 40 of hypothesis testing module 36. As can be seen from the above description, the hypothesized frame rate may be conditioned on a number of different statistics, and the rates of the previous frames and the frame quality measurements are examples of these statistics. For each data frame received, processor 40 uses the statistics to determine the rate at which to decode the frame.

A further refinement to the determination of the rate at which to decode a received frame of data considers the processing costs of decoding the frame at the various rates in conjunction with hypothesis testing. In this embodiment, an optimum test sequence of the rates is established based on both the probability distribution of the data rates and the cost of decoding at each of the data rates. The optimum test sequence is maintained by processor 40, which causes decoder 34 to sequentially decode a received frame of data according to the optimum sequence until the correct rate is found. The optimum test sequence is established to minimize the total expected cost of the rate search. Denoting $P_i$ to be the probability that the rate search will stop at test $T_i$, and $C_i$ to be the cost for conducting test $T_i$, the total expected cost of the rate search using test sequence $T_1, T_2, \ldots, T_M$, where M is the number of possible rates in the system and $1 \leq i \leq M$, can be modeled as:

$$C_{total} = C_1 * P_1 + (C_1 + C_2) * P_2 + \ldots (C_1 + C_2 + C_M) * P_M. \quad (7)$$

The optimum test sequence is found by minimizing the total expected cost $C_{total}$.

In Equation (7), the cost $C_i$ for conducting test $T_i$ will generally be the processing power required for decoding a frame at the rate specified by test $T_i$. The cost may be assigned to be proportional to the frame rate specified by the test $T_i$ because the computational complexity of decoder 34 is in general approximately proportional to the number of bits per frame. The probabilities $P_i$ may be assigned by the unconditioned a priori probability distribution of data rates as defined by Equation (3), or any of the conditional probability distributions defined by Equations (4), (5), or (6) above.

In a variable rate communications system where data frames are transmitted at 9,600 bps, 4,800 bps, 2,400 bps, and 1,200 bps, the following example illustrates the formulation of the optimum test sequence for rate determination of a received frame. The costs to decode the 9,600 bps, 4,800 bps, 2,400 bps, and 1,200 bps frames are assumed to be 9.6, 4.8, 2.4, and 1.2, respectively. Further, the probability of receiving a frame at each of the four rates is assumed to be the unconditioned a priori probabilities having the following values:

| | |
|---|---|
| Prob (9,600 bps) = 0.291, | (8) |
| Prob (4,800 bps) = 0.039, | (9) |
| Prob (2,400 bps) = 0.072, and | (10) |
| Prob (1,200 bps) = 0.598. | (11) |

The probabilities given in Equations (8)–(11) are derived from steady state empirical data.

A listing of all possible test sequences for rate determination in the system transmitting frames at 9,600, 4,800, 2,400, and 1,200 bps is shown in Table I below. In Table I, column 1 lists all possible test sequences $T_1, T_2, T_3, T_4$, where $T_i = 1$ refers to the test of decoding at 9,600 bps, $T_i = \frac{1}{2}$ refers to the test of decoding at 4,800 bps, $T_i = \frac{1}{4}$ refers to the test of decoding at 2,400 bps, and $T_i = \frac{1}{8}$ refers to the test of decoding at 1,200 bps. Columns 2 and 3 list the probability $P_1$ and the cost $C_1$ of performing the test $T_1$, columns 4 and 5 list the probability $P_2$ and the cost $C_2$ of performing the test $T_2$, columns 6 and 7 list the probability $P_3$ and the cost $C_3$ of performing the test $T_3$, and columns 8 and 9 list the probability $P_4$ and the cost $C_4$ of performing the test $T_4$. The total cost $C_{total}$ of performing the test sequence $T_1, T_2, T_3, T_4$ is listed in column 10.

TABLE I

| $T_1, T_2, T_3, T_4$ | $P_1$ | $C_1$ | $P_2$ | $C_2$ | $P_3$ | $C_3$ | $P_4$ | $C_4$ | $C_{total}$ |
|---|---|---|---|---|---|---|---|---|---|
| 1, 1/2, 1/4, 1/8 | 0.291 | 9.6 | 0.039 | 4.8 | 0.072 | 2.4 | 0.598 | 1.2 | 15.33 |
| 1, 1/2, 1/8, 1/4 | 0.291 | 9.6 | 0.039 | 4.8 | 0.598 | 1.2 | 0.072 | 2.4 | 13.98 |
| 1, 1/4, 1/2, 1/8 | 0.291 | 9.6 | 0.072 | 2.4 | 0.039 | 4.8 | 0.598 | 1.2 | 15.08 |
| 1, 1/4, 1/8, 1/2 | 0.291 | 9.6 | 0.072 | 2.4 | 0.598 | 1.2 | 0.039 | 4.8 | 12.25 |
| 1, 1/8, 1/2, 1/4 | 0.291 | 9.6 | 0.598 | 1.2 | 0.039 | 4.8 | 0.072 | 2.4 | 11.16 |
| 1, 1/8, 1/4, 1/2 | 0.291 | 9.6 | 0.598 | 1.2 | 0.072 | 2.4 | 0.039 | 4.8 | 10.90 |
| 1/2, 1, 1/4, 1/8 | 0.039 | 4.8 | 0.291 | 9.6 | 0.072 | 2.4 | 0.598 | 1.2 | 16.35 |
| 1/2, 1, 1/8, 1/4 | 0.039 | 4.8 | 0.291 | 9.6 | 0.598 | 1.2 | 0.072 | 2.4 | 15.00 |
| 1/2, 1/4, 1, 1/8 | 0.039 | 4.8 | 0.072 | 2.4 | 0.291 | 9.6 | 0.598 | 1.2 | 16.36 |
| 1/2, 1/4, 1/8, 1 | 0.039 | 4.8 | 0.072 | 2.4 | 0.598 | 1.2 | 0.291 | 9.6 | 10.97 |
| 1/2, 1/8, 1, 1/4 | 0.039 | 4.8 | 0.598 | 1.2 | 0.291 | 9.6 | 0.072 | 2.4 | 9.61 |
| 1/2, 1/8, 1/4, 1 | 0.039 | 4.8 | 0.598 | 1.2 | 0.072 | 2.4 | 0.291 | 9.6 | 9.62 |
| 1/4, 1, 1/2, 1/8 | 0.072 | 2.4 | 0.291 | 9.6 | 0.039 | 4.8 | 0.598 | 1.2 | 15.08 |
| 1/4, 1, 1/8, 1/2 | 0.072 | 2.4 | 0.291 | 9.6 | 0.598 | 1.2 | 0.039 | 4.8 | 12.26 |
| 1/4, 1/2, 1, 1/8 | 0.072 | 2.4 | 0.039 | 4.8 | 0.291 | 9.6 | 0.598 | 1.2 | 16.11 |
| 1/4, 1/2, 1/8, 1 | 0.072 | 2.4 | 0.039 | 4.8 | 0.598 | 1.2 | 0.291 | 9.6 | 10.71 |
| 1/4, 1/8, 1/2, 1 | 0.072 | 2.4 | 0.598 | 1.2 | 0.039 | 4.8 | 0.291 | 9.6 | 7.89 |
| 1/4, 1/8, 1, 1/2 | 0.072 | 2.4 | 0.598 | 1.2 | 0.291 | 9.6 | 0.039 | 4.8 | 6.87 |
| 1/8, 1, 1/4, 1/2 | 0.598 | 1.2 | 0.291 | 9.6 | 0.072 | 2.4 | 0.039 | 4.8 | 5.51 |
| 1/8, 1, 1/2, 1/4 | 0.598 | 1.2 | 0.291 | 9.6 | 0.039 | 4.8 | 0.072 | 2.4 | 5.76 |
| 1/8, 1/2, 1, 1/4 | 0.598 | 1.2 | 0.039 | 4.8 | 0.291 | 9.6 | 0.072 | 2.4 | 6.79 |
| 1/8, 1/2, 1/4, 1 | 0.598 | 1.2 | 0.039 | 4.8 | 0.072 | 2.4 | 0.291 | 9.6 | 6.79 |
| 1/8, 1/4, 1/2, 1 | 0.598 | 1.2 | 0.072 | 2.4 | 0.039 | 4.8 | 0.291 | 9.6 | 6.54 |
| 1/8, 1/4, 1, 1/2 | 0.598 | 1.2 | 0.072 | 2.4 | 0.291 | 9.6 | 0.039 | 4.8 | 5.52 |

As shown in Table I, the optimum test sequence is the sequence ⅛, 1, ¼, ½ shown in the 19th row. This test sequence offers the lowest total expected cost of processing.

Therefore, the rate determination system would decode a received frame of data at 1,200 bps first. If the decoding at 1.200 bps is not successful, then the frame would be decoded sequentially at 9,600 bps, 2,400 bps, and 4,800 bps until the correct rate is found. In a preferred embodiment, the optimum test sequence is maintained by processor 40 of hypothesis testing module 36. For each frame of data received, processor 40 causes decoder 34 to decode the frame sequentially according to the optimum test sequence, with each decoding checked by data check element 42, until the correct data rate is found. Processing resources are efficiently utilized in this rate determintion sysyem because the decoding is performed sequentially according to an optimum search sequence.

Based on the embodiments described above, it will be understood by one skilled in the art that the present invention is applicable to all systems in which data has been encoded according to a variable rate scheme and the data must be decoded in order to determine the rate. Even more generally, the invention is applicable to all systems in which the encoded data E is a function of the data D and some key k, and there exists some information in D or E which permits the verification of the correct D by the receiver. The sequence k may be time varying. The encoded data is represented as:

$$E = f(D, k), \quad (1)$$

where k is from a small set K of keys and where some probability function exists on the set of keys. The inverse of the encoding, or the decoding, can be represented as:

$$D = f^{-1}(E, k), \quad (2)$$

where k is chosen so that D is correct.

As an example, assume that D is data composed of fixed-length sequence D1 and fixed length sequence D2 so that D=D1, D2. Sequence D2 is the Cyclic Redundancy Code (CRC) of D1, so that D2=fcrc(D1). Assume also that the encoding function, f(D,k), is an exclusive-OR of a fixed-length D with the fixed length sequence k. Then, the decoding, $f^{-1}(E,k)$, would be the exclusive-OR of E with the correct k. The correct k is verified by checking whether D2=fcrc(D1). The correct k can be found by decoding all possible k's in K and then determining whether the CRC check passes. Alternatively, it can be done by sequentially decoding using one k at a time, with no further decoding once the "correct" k is found. According to the present invention, the order of sequential decoding is to be determined by hypothesis testing. A number of hypothesis tests, including the tests described above, may be utilized. The order of sequential decoding may in addition depend on the cost of processing, as described above. The use of hypothesis testing and/or cost functions in formulating a test sequence for rate determination reduces the average amount of processing as fewer k's will have to be tried.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a variable rate communications system, a sub-system for determining, at a receiver, the data rate of a received data frame, comprising:

a processor for generating a signal indicating the most likely rate of said received data frame in accordance with a predetermined hypothesis test;

a decoder for receiving said most likely rate signal and for decoding said received data frame into a decoded frame of bits at said most likely rate;

a data check element for receiving said decoded bits, generating error metrics characterizing said decoded bits, and generating a quality indication based on said error metrics for said decoded bits;

a vocoder for receiving said decoded bits and processing said decoded bits to provide speech to a user upon generation of a positive quality indication; and wherein upon generation of a negative quality indication, said processor further causes said decoder to perform additional decoding of said received data frame in accordance with at least one rate other than said most likely rate.

2. The rate determination sub-system of claim 1, wherein said additional decoding is performed sequentially in accordance with a predetermined test sequence of data rates;

wherein said data check element generates error metrics for each said additional decoding and generates a quality indication based on said error metrics for each said additional decoding; and wherein said additional decoding terminates upon generation of a positive quality indication.

3. The rate determination sub-system of claim 1, wherein said additional decoding comprises exhaustive decoding of said received data frame at all rates of a rate set except said most likely rate; and wherein said data check element generates error metrics for each said additional decoding and determines the rate of said received data frame in accordance with said error metrics.

4. In a variable rate communications system, a sub-system for determining, at a receiver, the data rate of a received data frame, comprising:

a processor for generating a test sequence of data rates for determining the rate of a received data frame, said test sequence being generated in accordance with a predetermined hypothesis test;

a decoder for decoding said received data frame sequentially according to said test sequence and generating a decoded frame of bits for each rate at which said received data frame is decoded;

a data check element for generating error metrics characterizing said decoded bits and for generating a quality indication based on said error metrics for each rate at which said received data frame is decoded; and wherein no further decoding is performed upon generation of a positive quality indication.

5. The rate determination sub-system of claim 4 wherein said hypothesis test is based on an a priori probability distribution of data rates.

6. The rate determination sub-system of claim 4 wherein said hypothesis test is based on a conditional probability distribution of data rates conditioned on the rate of at least one previous received data frame.

7. The rate determination sub-system of claim 4 wherein said hypothesis test is based on a conditional probability distribution of data rates conditioned on at least one frame quality measurement.

8. The rate determination sub-system of claim 5 wherein said test sequence is generated further in accordance with the cost of decoding said received data frame at each of said data rates.

9. The rate determination sub-system of claim 6 wherein said test sequence is generated further in accordance with the cost of decoding said received data frame at each of said data rates.

10. The rate determination sub-system of claim 7 wherein said test sequence is generated further in accordance with the cost of decoding said received data frame at each of said data rates.

11. The rate determination sub-system of claim 4 further comprising a vocoder for receiving said decoded bits and processing said decoded bits to provide speech to a user upon generation of a positive quality indication.

12. The rate determination sub-system of claim 4 wherein said error metrics include a Cyclic Redundancy Check result.

13. The rate determination sub-system of claim 4 wherein said error metrics include a Symbol Error Rate metric.

14. The rate determination sub-system of claim 4 wherein said error metrics include a Yamamoto quality metric.

15. The rate determination sub-system of claim 4 wherein said processor comprises a memory for storing said test sequence of data rates.

16. The rate determination sub-system of claim 4 wherein said decoder is a Viterbi decoder.

17. A method for determining the rate of a received data frame in a variable rate communications system, comprising the steps of:

receiving a wide-band signal;

demodulating said wide-band signal to produce a data signal, wherein said data signal has been transmitted at one of a set of possible transmission rates;

generating a test sequence of data rates for determining the rate of said data signal, said test sequence being generated in accordance with a predetermined hypothesis test;

decoding said data signal sequentially according to said test sequence to generate a decoded frame of bits for each rate at which said data signal is decoded;

generating error metrics characterizing said decoded frame of bits for each rate at which said data signal is decoded;

generating a quality indication based on said error metrics for each rate at which said data signal is decoded; and upon generation of a positive quality indication, providing said decoded frame of bits to a vocoder which processes said decoded bits to provide speech to an user.

18. The method of claim 17 wherein said hypothesis test is based on an a priori probability distribution of data rates.

19. The method of claim 17 wherein said hypothesis test is based on a conditional probability distribution of data rates conditioned on the rate of at least one previous received data frame.

20. The method of claim 17 wherein said hypothesis test is based on a conditional probability distribution of data rates conditioned on at least one frame quality measurement.

21. The method of claim 18 wherein said test sequence is generated further in accordance with the cost of decoding said received data frame at each of said data rates.

22. The method of claim 19 wherein said test sequence is generated further in accordance with the cost of decoding said received data frame at each of said data rates.

23. The method of claim 20 wherein said test sequence is generated further in accordance with the cost of decoding said received data frame at each of said data rates.

* * * * *

UNITED STATES PATENT AND TRADEMARK OFFICE
CERTIFICATE OF CORRECTION

PATENT NO. : 6,108,372
DATED : August 22, 2000
INVENTOR(S) : Edward G. Tiedemann, Jr. and Yu-Chuan Lin It is certified that error appears in the above-identified patent and that said Letters Patent is hereby corrected as shown below:

Title page showing the illustrative figures should be deleted to be replaced with the attached title page.

Drawing sheet, consisting of Fig. 2, should be deleted to be replaced with the drawing sheet, consisting of Fig. 2, as shown on the attached page.

Title page,
Item [75], change "Tidemann" to -- Tiedemann --.

Drawings,
Figure 2, please change "RECIEVER" to -- RECEIVER --.
Figure 2, please change "PROCCESSOR" to -- PROCESSOR --.

Column 2,
Line 2, please change "are" to -- is --.

Column 11,
Line 26, please change "(1)" to -- (8) --.
Line 31, please change "(2)" to -- (9) --.

Signed and Sealed this

Nineteenth Day of August, 2003

JAMES E. ROGAN
*Director of the United States Patent and Trademark Office*

United States Patent [19]

Tidemann, Jr. et al.

[11] Patent Number: 6,108,372
[45] Date of Patent: Aug. 22, 2000

[54] METHOD AND APPARATUS FOR DECODING VARIABLE RATE DATA USING HYPOTHESIS TESTING TO DETERMINE DATA RATE

[75] Inventors: Edward G. Tidemann, Jr., San Diego, Calif.; Yu-Chuan Lin, Vancouver, Canada

[73] Assignee: Qualcomm Inc., San Diego, Calif.

[21] Appl. No.: 08/741,273

[22] Filed: Oct. 30, 1996

[51] Int. Cl.[7] .............................. H04B 3/46; H04B 17/00
[52] U.S. Cl. ...................... 375/225; 375/341; 714/704; 714/795
[58] Field of Search ................................... 375/200, 206, 375/224, 225, 262, 265, 240, 340, 341; 370/203, 208, 209, 320, 335, 342, 441, 447, 479; 455/67.1; 371/5.1, 43.6, 43.7; 704/201, 229, 500; 364/400.01, 550

[56] References Cited

U.S. PATENT DOCUMENTS

| | | | |
|---|---|---|---|
| 4,748,626 | 5/1988 | Wong | 371/30 |
| 4,845,714 | 7/1989 | Zook | 371/50 |
| 5,023,889 | 6/1991 | Divsalar et al. | 375/27 |
| 5,056,117 | 10/1991 | Gitlin et al. | 375/102 |
| 5,208,816 | 5/1993 | Seshardsi et al. | 371/43 |
| 5,416,787 | 5/1995 | Kodama et al. | 371/43 |
| 5,509,020 | 4/1996 | Iwakiri et al. | 371/5.1 |
| 5,566,206 | 10/1996 | Butler et al. | 375/225 |
| 5,671,255 | 9/1997 | Wang et al. | 375/341 |
| 5,710,784 | 1/1998 | Kindred et al. | 375/262 |
| 5,751,725 | 5/1998 | Chen | 371/5.5 |
| 5,796,757 | 8/1998 | Czaja | 371/46 |

FOREIGN PATENT DOCUMENTS

| | | | |
|---|---|---|---|
| 0413505 | 8/1990 | European Pat. Off. | H03M 13/12 |
| 0544315 | 11/1992 | European Pat. Off. | H03M 13/00 |
| 0711056 | 5/1996 | European Pat. Off. | H04L 23/02 |
| 0713305 | 5/1996 | European Pat. Off. | H04L 25/02 |

OTHER PUBLICATIONS

"Viterbi Decoding Algorithm for Convolutional Codes with Repeat Request" by Hirosuke Yamamoto et al.; *IEEE Transactions on Information Theory*, vol. IT–26 No. 26. pp540–547.

"Generalized Viterbi Algorithms for Error Detection with Convolutional Codes" by N. Seshadri et al.; *AT&T Bell Laboratories*, 1989, IEEE pp. 1534–1538.

"Combined Source and Channel Coding of Subband Coded Speech with Post-enhancement" by W.C. Wong et al.; *Communications System;Toward Global Integration*, Nov. 1990, vol. 2. 886–890.

*Primary Examiner*—Temesghen Ghebretinsae
*Attorney, Agent, or Firm*—Philip Wadsworth; Thomas R. Rouse

[57] ABSTRACT

A system and method for determining the data rate of a frame of data at a receiver of a variable rate communications system. A vocoder at a transmitter encodes a frame of data at one of the rates of a predetermined set of rates. The data rate is dependent on the speech activity during the time frame of the data. The data frame is also formatted with overhead bits, including bits for error detection and detection. At the receiver, the data rate for the frame is determined based on hypothesis testing. Because the data rate is based on speech activity, a hypothesis test may be designed based on the statistics of speech activity. The received data frame is first decoded into information bits at the most probable rate as provided by the hypothesis test. Error metrics are generated for the decoded information bits. If the error metrics indicate that the information bits are of good quality, then the information bits are presented to a vocoder at the receiver to be processed for interface with the user. If the error metrics indicate that the information bits have not been properly decoded, then the received data frame is decoded at the other rates of the set of rates until the actual data rate is determined.

23 Claims, 8 Drawing Sheets

RECEIVING SYSTEM

FIG. 2